(No Model.)  2 Sheets—Sheet 1.
E. DEVONSHIRE.
REVOLVING WATER PURIFIER.
No. 439,588.  Patented Oct. 28, 1890.
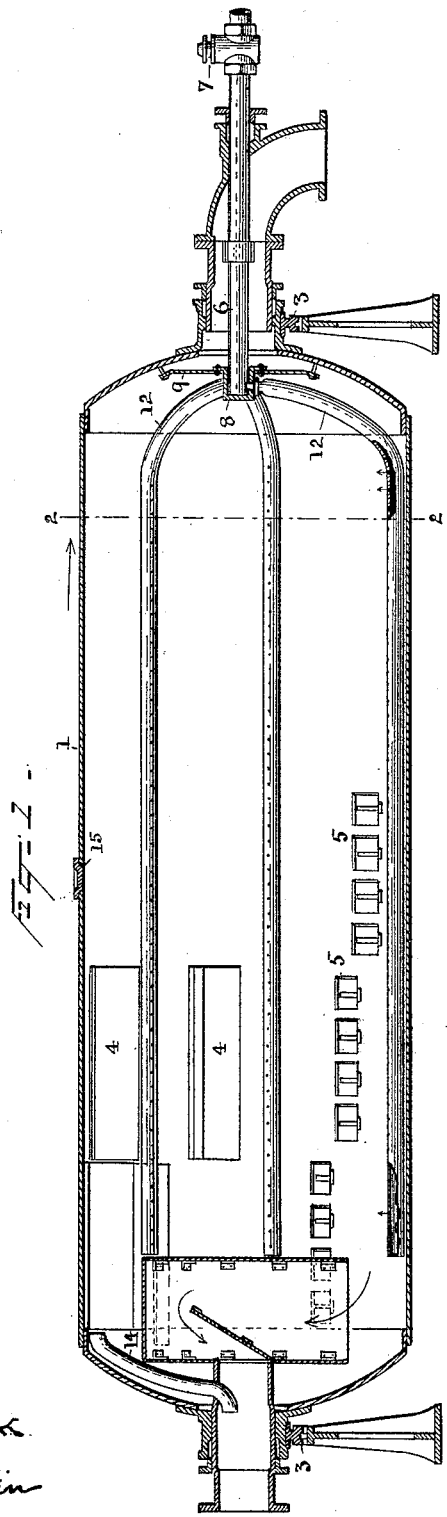
WITNESSES:
Norris St. Clark
Charles M. Catlin
INVENTOR
Easton Devonshire,
BY
Dyer & Seely
ATTORNEYS.

(No Model.) 2 Sheets—Sheet 2.
E. DEVONSHIRE.
REVOLVING WATER PURIFIER.
No. 439,588. Patented Oct. 28, 1890.
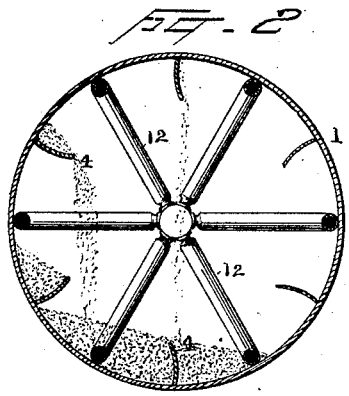
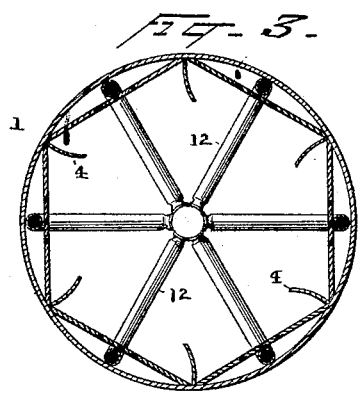
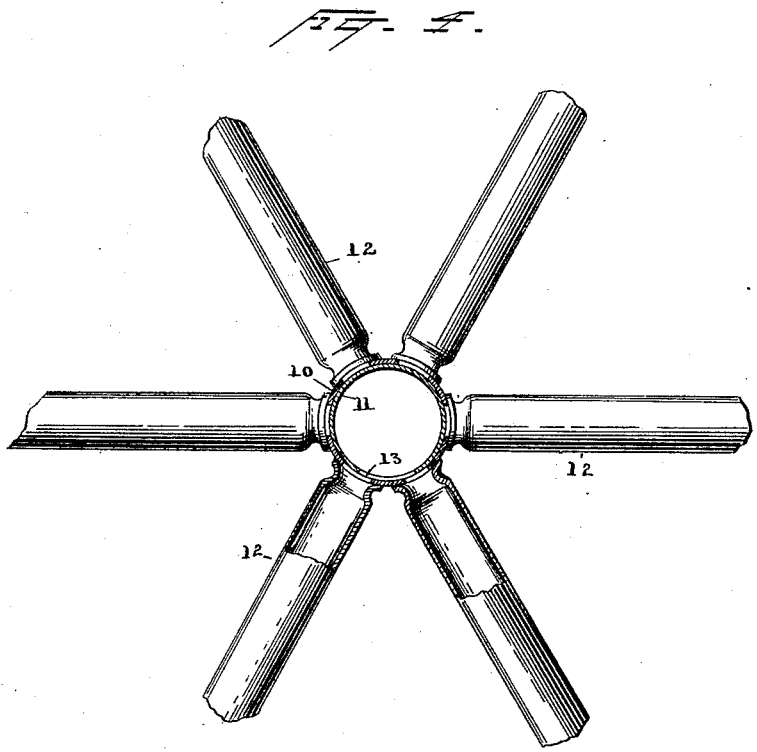
WITNESSES:
Norris H. Clark
Charles M. Catlin
INVENTOR
Easton Devonshire,
BY
Dyer & Seely,
ATTORNEYS.

UNITED STATES PATENT OFFICE.

EASTON DEVONSHIRE, OF LONDON, ENGLAND, ASSIGNOR TO THE REVOLVING PURIFIER COMPANY, LIMITED, OF SAME PLACE.

REVOLVING WATER-PURIFIER.

SPECIFICATION forming part of Letters Patent No. 439,588, dated October 28, 1890.

Application filed April 25, 1890. Serial No. 349,443. (No model.)

*To all whom it may concern:*

Be it known that I, EASTON DEVONSHIRE, of London, county of Middlesex, England, a subject of the Queen of Great Britain, have invented an Improved Revolving Water-Purifier, which is described in the accompanying specification.

My invention relates to the class of water-purifiers invented by William Anderson, in which iron or other purifying material is constantly agitated, and the water to be treated is simultaneously brought in contact therewith.

My object is to produce an improved arrangement of apparatus for the thorough aeration of the water during its passage through the purifier. It has heretofore been proposed to introduce a perforated air-pipe to the center of the cylinder for this purpose. This arrangement partially accomplishes the desired end, but is imperfect, owing to the fact that it introduces the air above the larger mass of the water in the purifier. According to my improvement the air, carbonic oxide, or other suitable gas is introduced to the cylinder and led along the lower side thereof and rises through the entire body of water, thereby coming in contact with a much larger quantity than in the arrangement heretofore used.

My invention is illustrated in the accompanying drawings, in which—

Figure 1 is a central longitudinal section of a purifier. Fig. 2 is a cross-section on line 2 2 of Fig. 1. Fig. 3 is a cross-section of a modified form; and Fig. 4 is a view, on a larger scale, of a detail, hereinafter described.

The drum or cylinder 1 is mounted in such manner that it may be revolved by the application of power. In the form illustrated it rests on journaled bearings 3. This cylinder is provided on its inner periphery with shelves 4, which may be in short sections, as shown, or may extend the whole length of the cylinder, as shown in patent to William Anderson, No. 322,148. These shelves are for the purpose of raising comminuted purifying material placed in the bottom of the cylinder and showering it down through the water passing through the cylinder, and are preferably placed about midway between the air-passages, hereinafter described. The short sections 5 are for counteracting the tendency of the current to carry the purifying material along, as set forth in the above patent.

6 is a pipe communicating with a device for forcing air or other gas into the cylinder. This pipe is provided with a valve at 7, and terminates in a box 8, which is preferably connected to the distributing-plate 9, as shown in the drawings. By reference to Fig. 4 it will be seen that this box comprises two cylinders 10 11—one within the other. To the outer cylinder are connected branch pipes 12—six, (more or less.) These pipes lead to the inner periphery of the cylinder and thence along the length of the cylinder. That portion of the pipe which lies along the length of the cylinder is perforated with small holes for the escape of air, as shown. The inner cylinder, which may be merely the end of pipe 6, or may be an enlarged section connected thereto, is stationary, and is provided on one side with an opening 13, which, when six pipes are used, embraces substantially one-sixth of the circumference of the cylinder. The diameter of the bore of pipes 12 is about one-half the length of the opening 13.

In Fig. 3 the pipes 12 are led along the end of the cylinder to the periphery, as in Figs. 1 and 2, but terminate at that point. Around the inner periphery of the cylinder is placed a series of partitions, straight or curved, which subtend segments of the cylinder. These partitions are perforated for the escape of air, and the pipes 12 communicate with the space beneath them. With this form of apparatus the air-space along the bottom of the cylinder is more extended than in the other form described, and the partitions have the effect of increasing the strength and rigidity of the cylinders. This is particularly useful in apparatus of large capacity. The shelves 4 may be mounted on these partitions instead of between them, as shown.

14 is a pipe leading from the upper part of the cylinder to the water-outlet, the purpose of which is to afford an escape for the air after it has passed through the water. This pipe may terminate as shown, or it may extend entirely out of the exit-pipe.

The operation of this apparatus will now be described. Through a hand-hole 15, or in any other suitable way, purifying material is introduced and spread along the bottom of the cylinder. This cylinder is revolved and the water and air valves opened. The revolution of the cylinder raises the purifying material and showers it down through the water passing through the cylinder, and the air from box 8 passes to the bottom of the cylinder and escapes upward through the water. By reference to Fig. 4 it will be seen that the parts are so proportioned that the opening 13 will always be in communication with at least one of the pipes 12, and during a portion of time will be in communication with two of said pipes—that is, before cutting off communication from one pipe communication with a succeeding pipe is established, and the entire bore of each pipe will be in communication with said opening when in its most effective position—that is, when it extends vertically downward. The flow of water is so regulated that it will remain in the cylinder from three to six minutes, according to the character of the water being treated, and will flow out as indicated by the arrow. The air or gas which has been used will pass out through pipe 14, as before indicated.

Having described my invention, what I claim is—

1. The combination, in a water-purifier, of a revolving drum containing purifying material and air-distributing passages along the inner periphery of the drum, with means for directing air to a passage below the water in the purifier, substantially as described.

2. The combination, in a water-purifier, of a revolving drum containing purifying material, air-passages along the inner periphery of the drum, and an air-inlet communicating with the passage or passages at the bottom of the drum and communicating with an air-supply, substantially as described.

3. The combination, in a water-purifier, of a revolving drum having water inlet and outlet passages and air-passages along the inner periphery of the drum, substantially as described.

4. The combination, in a water-purifier, of a revolving drum, air-passages along its inner periphery, and shelves between the air-passages, substantially as described.

5. The combination, in a water-purifier, of a revolving drum, perforated partitions subtending sections of the inner periphery of the drum, and an air-supply communicating with the space behind said partitions, substantially as described.

6. The combination, in a water-purifier, of a revolving drum, an air-pipe extending through the bearing of the drum and communicating with an air-box which communicates with an air-passage along the lower side of the drum, substantially as described.

7. The combination, in a water-purifier, of a revolving drum with water inlet and outlet passages, an air-tube leading into said drum, and an air-tube leading from the upper side of the drum to the outlet thereof, substantially as described.

8. The combination, in a water-purifier, of an air-box comprising an outer revolving cylinder with radiating pipes connected thereto and an inner fixed cylinder having an opening on its lower side communicating with said radiating pipes in succession, substantially as described.

This specification signed and witnessed this 28th day of January, 1890.

EASTON DEVONSHIRE.

Witnesses:
CHARLES M. CATLIN,
W. PELZER.